United States Patent [19]
Arao
[11] Patent Number: 4,739,350
[45] Date of Patent: Apr. 19, 1988

[54] PICTURE PROCESSING UNIT

[75] Inventor: Kozo Arao, Yokohama, Japan

[73] Assignee: Canon Kabushiki Kaisha, Tokyo, Japan

[21] Appl. No.: 840,980

[22] Filed: Mar. 13, 1986

Related U.S. Application Data

[63] Continuation of Ser. No. 485,385, Apr. 20, 1983, abandoned, which is a continuation of Ser. No. 188,266, Sep. 17, 1980, abandoned.

[30] Foreign Application Priority Data

Sep. 21, 1979 [JP] Japan ............................ 54-121746
Sep. 21, 1979 [JP] Japan ............................ 54-121747

[51] Int. Cl.[4] .................... G01D 15/14; G03G 15/00
[52] U.S. Cl. .................................... 346/160; 355/7; 355/14 R; 358/300
[58] Field of Search .................. 355/3 R, 6, 7, 14 R; 346/153.1, 160; 358/296, 300

[56] References Cited

U.S. PATENT DOCUMENTS

| | | | |
|---|---|---|---|
| 4,236,809 | 12/1980 | Kermisch | 355/3 R X |
| 4,251,152 | 2/1981 | Miyakawa et al. | 355/3 R |
| 4,256,400 | 3/1981 | Komori et al. | 355/7 X |
| 4,267,548 | 5/1981 | Kimura et al. | 355/3 R X |
| 4,268,164 | 5/1981 | Yajima et al. | 355/7 X |
| 4,303,332 | 12/1981 | Sakai | 355/7 X |
| 4,315,684 | 2/1982 | Sugiura et al. | 355/14 R |
| 4,322,157 | 3/1982 | Miura et al. | 355/7 X |

*Primary Examiner*—Fred L. Braun
*Attorney, Agent, or Firm*—Fitzpatrick, Cella, Harper & Scinto

[57] ABSTRACT

A picture processing unit has an image sensor for reading the picture of an original wherein a partial region of the picture of the original is designated, and the read signal from the image sensor is processed in another region different from the partial region by a processor. A recorder records the image corresponding to the original picture on a recording body in accordance with the processed signal output from the processor.

37 Claims, 10 Drawing Sheets

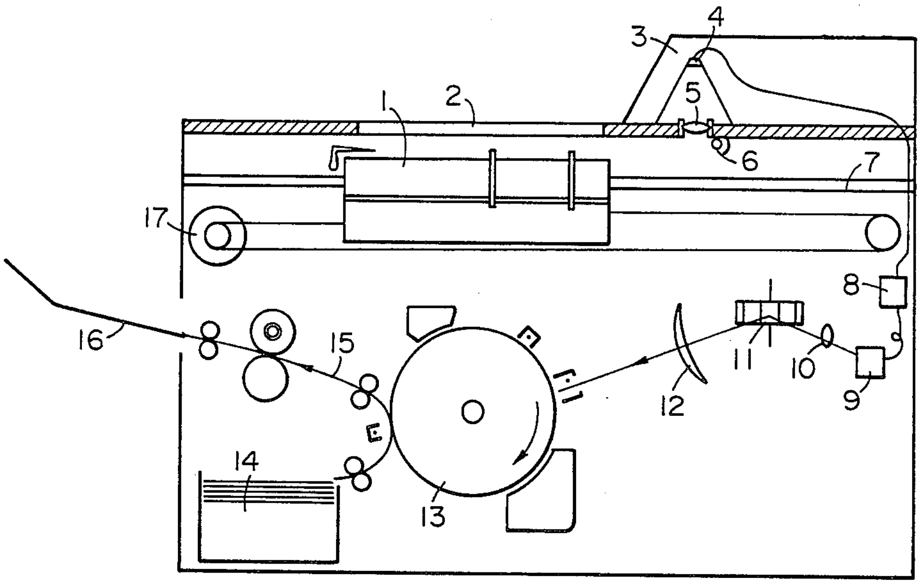
FIG. 1A
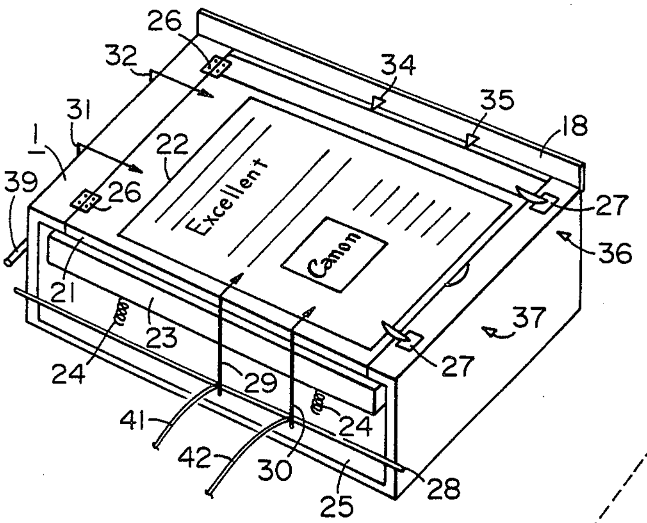
FIG. 1B
FIG. 1C
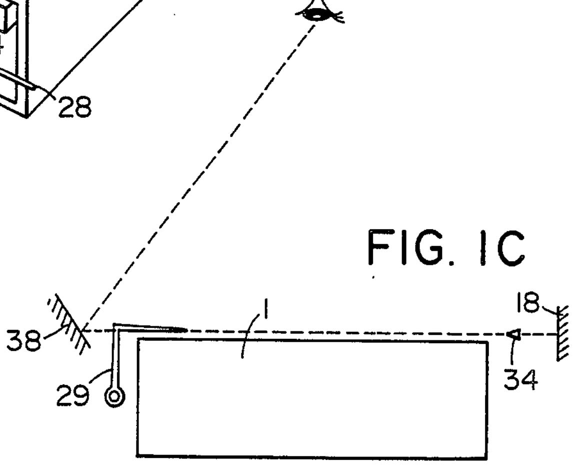

PICTURE PROCESSING UNIT

This application is a continuation of application Ser. No. 485,385, now abandoned, filed Apr. 20, 1983, which is a continuation of application Ser. No. 188,266, filed Sept. 17, 1980, now abandoned.

BACKGROUND OF THE INVENTION

1. Field of the Invention

This invention relates to a picture processing unit which reads picture information on an original and processes said information electrically and to the mechanism for reading.

2. Description of the Prior Art

Until now, in picture recording units, especially in copying units, although the deformation, reversion, and back printing of the entire picture have been performed, the deformation, reversion, and back printing of a partial image on the picture have not been put into practice.

The reason for this is that since in the conventional copying machines the latent image of original picture information is formed on a light sensitive body, etc. through an optical system, a large scale of unit is required. However, there are cases in which insertion of a reduced graph or table into a handmade original, reversion of a part of a drawing or sentences, or back printing of a portion of a drawing or design is desired.

If these operations become possible with a unit having an inexpensive and simple mechanism, it is very convenient. On the other hand, the word processors known at present having a memory capacity greater than the capacity of one page of picture, indicate such information in the memory on CRT screen. The operator makes editorial directions using a light pen or keyboard while watching the CRT picture, and after reassembling the information in the memory according to the directions, sets this in-memory information on the picture recording unit which uses a laser beam, etc. to visualize it. Consider how much capacity is required to store in a digital memory the picture information of A4 size. Assuming 20 bits (picture element 10 lines/mm) per mm, 24M bits are required since A4 size is $$210 \times 290 \text{ and } (210 \times 20) \times (290 \times 20) = 2.436 \times 10^7 \cong 24\ M \text{ bits.}$$

To provide an editorial function a buffer memory having the same or more capacity as 24M bits is required. This makes the entire unit very expensive.

SUMMARY OF THE INVENTION

Taking into consideration the above-mentioned matters, an object of this invention is to offer a simple and inexpensive picture processing unit capable of performing partial deformation, reversion, back printing, trimming, etc. which completely eliminates the use of a large capacity memory, a CRT display, etc. An object of this invention is to offer a picture processing unit comprising an image sensor to read the optical information on the original, a processing means to process the read signals coming from said image sensor, a recording means to record on a recording body the image which corresponds to said original, and positioning members to designate a partial region of said original on said original, said processing means performing different processing in said partial region and in other regions.

Another object of this invention is to offer a picture position setting unit suitable to set the position of the picture section in such a picture processing unit. Another object of this invention is to offer a picture position setting unit comprising an original table on which the original is placed with the surface to be read faced up, a movable positioning member to determine a partial picture position on the original, and a detecting means to detect the moved position of said positioning member as electrical signals.

The objects of this invention other than those mentioned above will be made clear from the appended drawings and the detailed descriptions which follow.

BRIEF DESCRIPTION OF THE DRAWINGS

FIG. 1A is the cross sectional view of the copying unit to which this invention is applicable.

FIG. 1B is the oblique view of the original table 1.

FIG. 1C is a drawing showing the method for matching cursor 29 with the position mark 34.

FIG. 4B is a circuit to obtain the signal AS.

FIGS. 9A-1 and 9A-2 is a diagram of a circuit for performing deformation in the main scanning direction.

DETAILED DESCRIPTION OF PREFERRED EMBODIMENTS

Figure 2A:
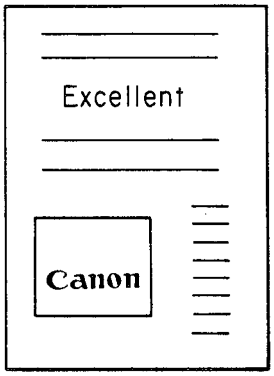
FIG. 2A is a drawing showing an example of original paper.

One embodiment of this invention will be described referring to the drawings.

Figure 9A:
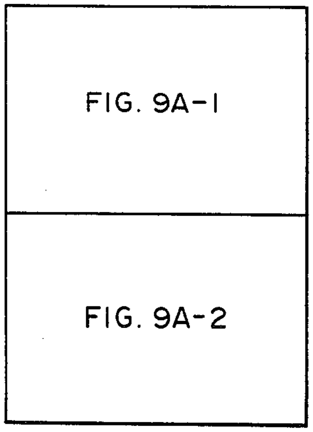
FIG. 9A comprising
Figures 1, 9A:
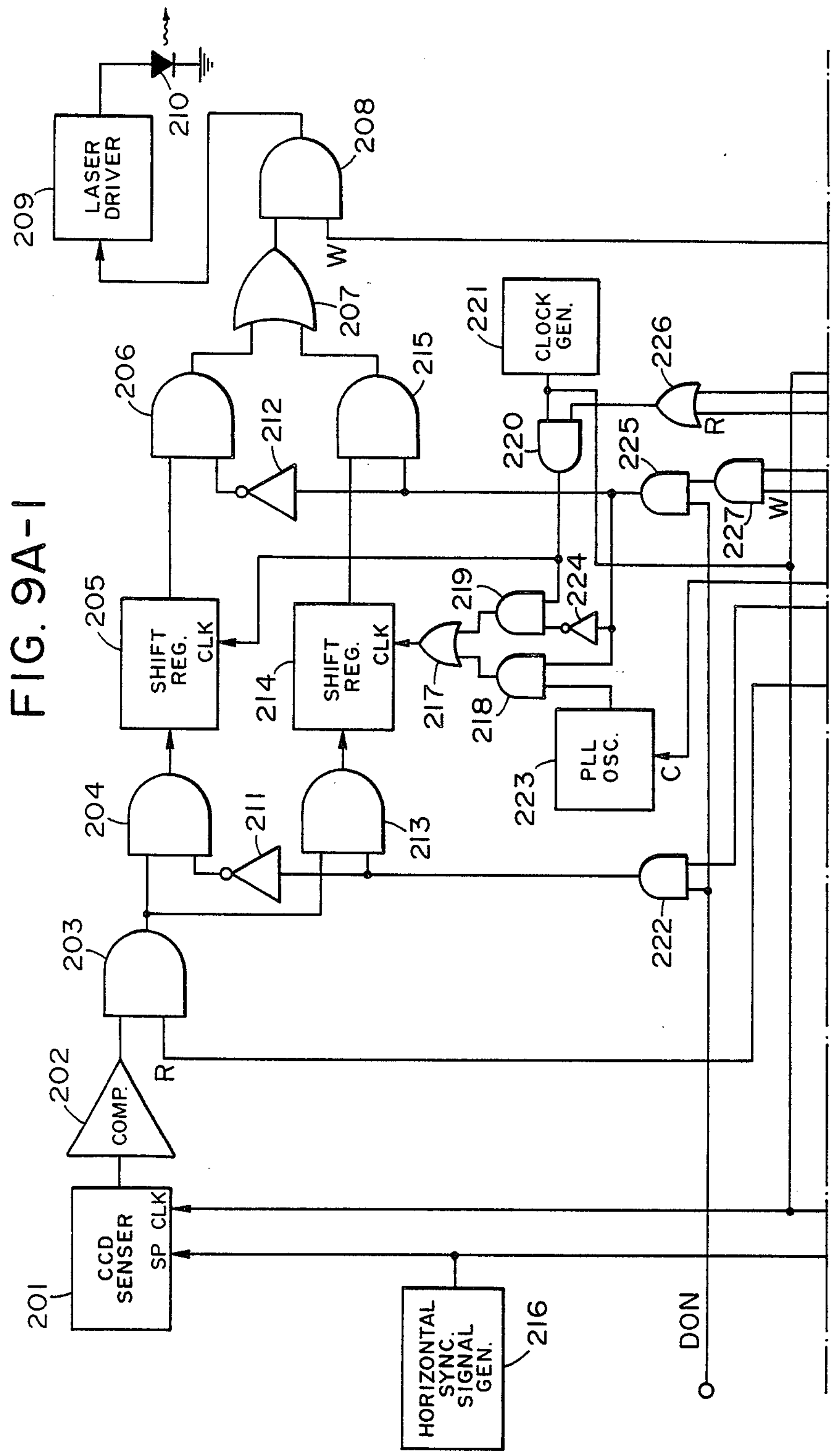
Figures 2, 9A:
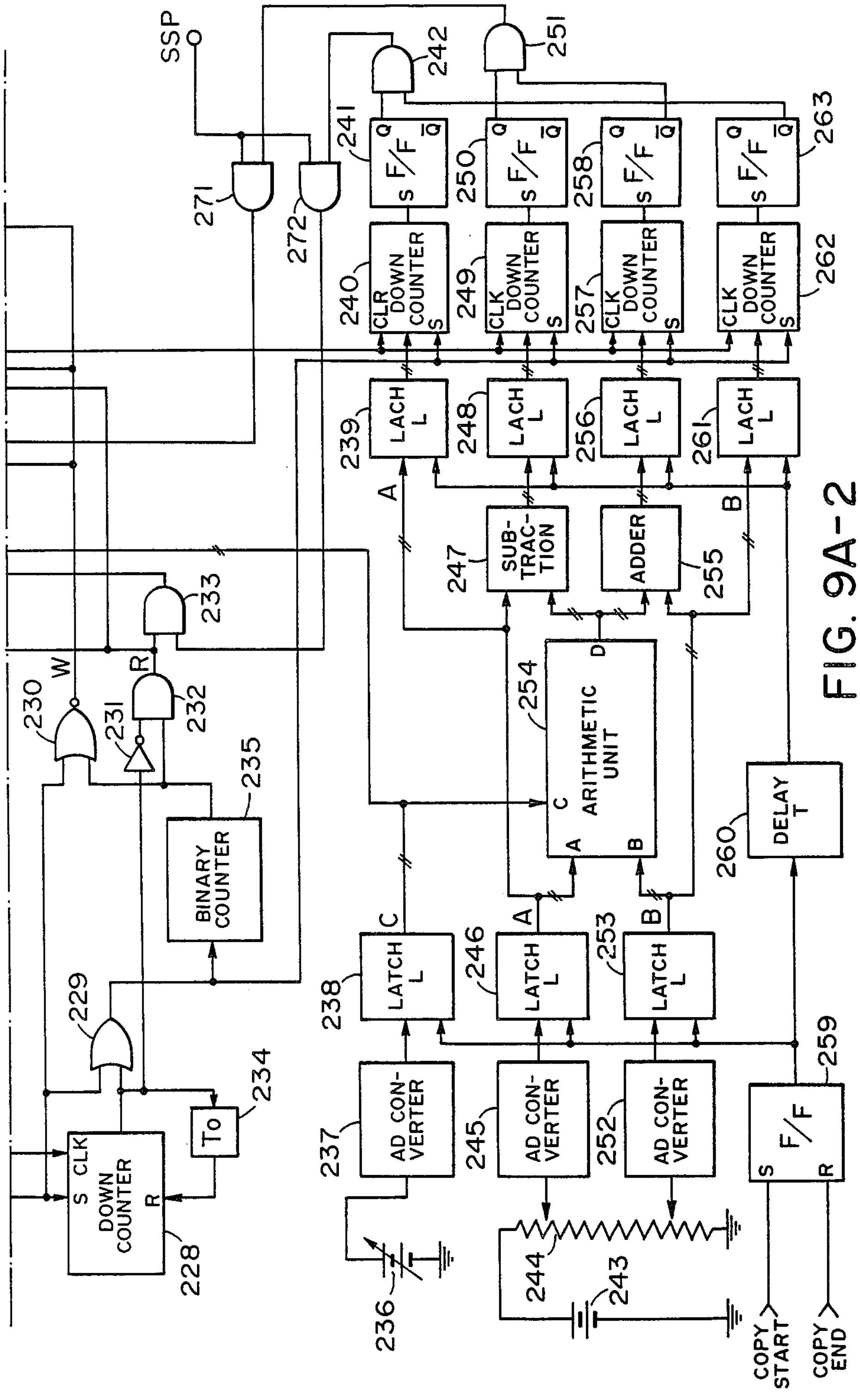

FIG. 1 shows the cross sectional view of the copying unit to which this invention is applicable. 1 is the original table. Since the glass plate 2, which is acting to protect the inside, is allowed to open or close, the original is set on 1, face side up, by opening the glass plate 2. The original table is moved rightward at a constant speed along the travel guide 7 by the motor 17. When the face of the original reaches the read section consisting of an illumination lamp 6, image-forming lens 5, CCD one dimensional image sensor 4, and dark box 3, the CCD starts photoelectric conversion and the electric output is digitalized and input to the processing circuit 8 which contains a shift register.

The processing circuit 8 reads out the picture information in the shift register by predetermined synchronizing pulses to modulate a semiconductor laser 9. The laser beam from the laser 9 is passed through a collimeter lens 10, reflected by the scanner mirror 11, to become a scanning beam and forms a latent image on the photosensitive drum 13 after passing through the f.θ lens 12.

The latent image is visualized by a well-known electrophotographic process, transcribed on the paper coming from the paper container 14 and then discharged to the paper discharge tray 16.

FIG. 1B shows detailed oblique view of the original table 1 shown in FIG. 1A. 21 is the glass plate used to press the original, which is allowed to open or close by the hinges 26. The original is set in open state. The original 22 is placed with surface-to-be-read up and pressed against the bottom surface glass plate 21 by pressure plate 23 and springs 24.

This enables book form originals to be copied, too. 27 is a glass plate stopper which is used to fix the glass plate 21 when obtaining a picture. 28 is a guide of manually positioned picture positioning cursors 29 and 30. The guide 28 forms a straight line resistance having the same line resistivity. Electrical signals (voltages) which correspond to the positions of the cursors 29 and 30 are obtained by applying a predetermined voltage across both ends of the guide 28 and the signals are output to the lead wires 41 and 42. Cursors 31 and 32 are quite the same in construction. The position marks 34 through 37 are set to corresponding positions of the cursors manually be means of a mirror (not shown) in the drawing or set to the positions corresponding to the electrical signals from the cursors by electrically driven means such as a servo motor.

The case of manual operation will be described in detail by referring to FIG. 1C. The image of the cursor 29 is not only visible through the mirror 38 but also reflected once by the mirror 18 held vertically and brought to the eyes by the mirror 38. If at this point, the position mark 34 is made to overlap both images, it is possible to set the position mark to a position opposite to the cursor. The same applies to the cursors 30, 31 and 32. In this way a region is selected on the picture by the straight line (4 lines in the example shown) which connects cursors and the position marks corresponding to the cursors. These cursors and position marks become easier to operate if their travelling knobs are made to protrude to the outside of the unit. As has been described so far, since in this embodiment the original is set face up, it is possible to set the picture contained as a part of the original by operating the cursors which are regarded as positioning members. This means that there is no need of providing a separate display means such as CRT screen and that, moreover, the setting of picture position becomes easier.

Figure 2B:
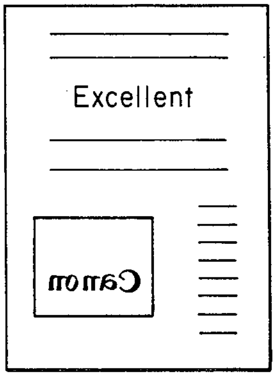
FIGS. 2B through 2F are drawings showing the pictures obtained from a region of the original paper and from a region other than said region by processing in different ways.
Figure 2C:
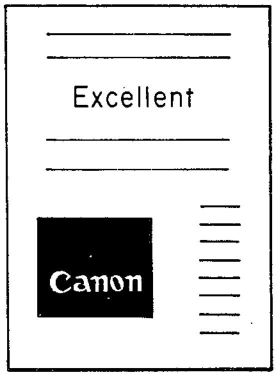
Figure 2D:
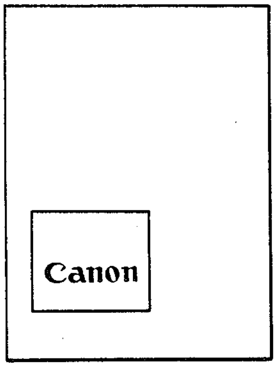
Figure 2E:
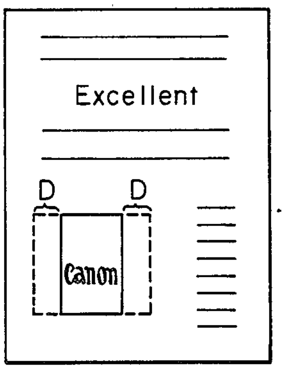
Figure 2F:
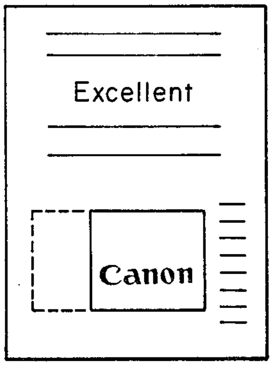

FIG. 2A shows the original, FIG. 2B an example of partial back printing, FIG. 2C partial reversion, FIG. 2D of trimming, and FIG. 2E of partial magnification. However, the magnifying direction of partial magnification shown in FIG. 2E is only one direction and the image is deformed in the form crushed sidewise. FIG. 2F shows the example in which the designated region has been shifted in position in the main scanning direction.

Now the process to obtain the pictures shown in FIGS. 2B through 2E will be described.

Figure 3A:
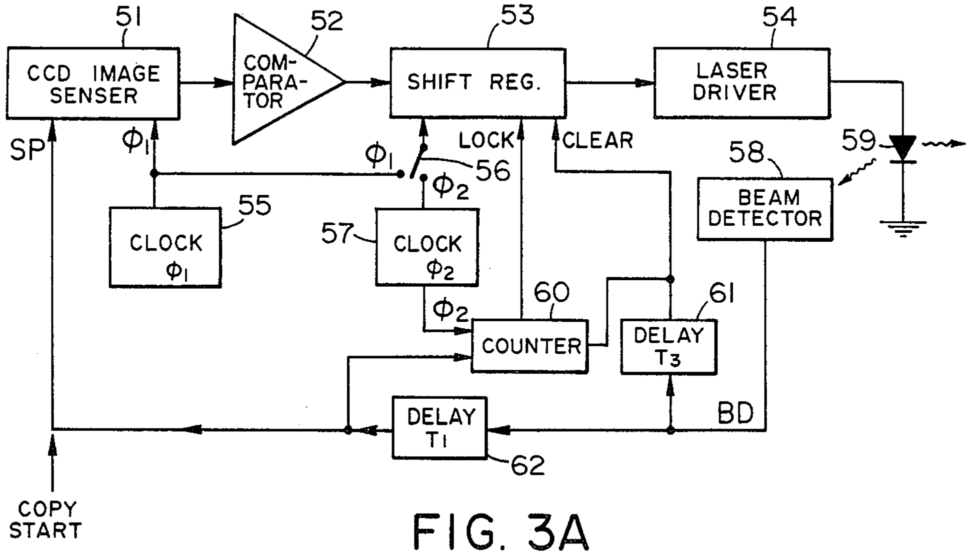
FIG. 3A is a signal processing circuit diagram to obtain the same picture as the original picture.

FIG. 3A shows the signal processing circuit for the case to obtain the same picture as the original picture.

The picture signal in the CCD image sensor is started to be output by the start pulse SP, synchronized with the clock pulse $\phi_1$ of the clock generator 55, and then output to the comparator 52. The comparator 52 digitizes the picture signal. The digital signals for one scanning line are synchronized with the clock pulse $\phi_1$ of the clock generator 55 and input to the shift register 53. The digital signal in the shift register 53 is read out, being synchronized with the clock pulse $\phi_2$ of the clock generator 57.

The pulse $\phi_2$ is generated in tune with the scanning effective width of the laser beam. The switching of shift clock pulses $\phi_1$ and $\phi_2$ of the shift register 53 is made by the high-speed digital switch 56. The output of the shift register 53 modulates the semiconductor laser 59 by way of the laser driver 54. The laser beam is detected by the beam detector placed near the photosensitive drum 13 of FIG. 1A, and this detecting signal BD generates the above-mentioned start pulse SP, being delayed by time $T_1$ by the delay circuit 62.

Moreover, the detecting signal BD releases the contents of the shift register 53 upon receipt of the output signal CLEAR of the delay circuit 61. The shift halt signal LOCK of the shift register 53 is obtained by the counter 60 which counts the number of pulses of the signal BD and clock pulse $\phi_2$. Thus, the invention has control means for causing an image sensor to produce a recording signal a predetermined time after detection by detecting means.

Figure 3B:
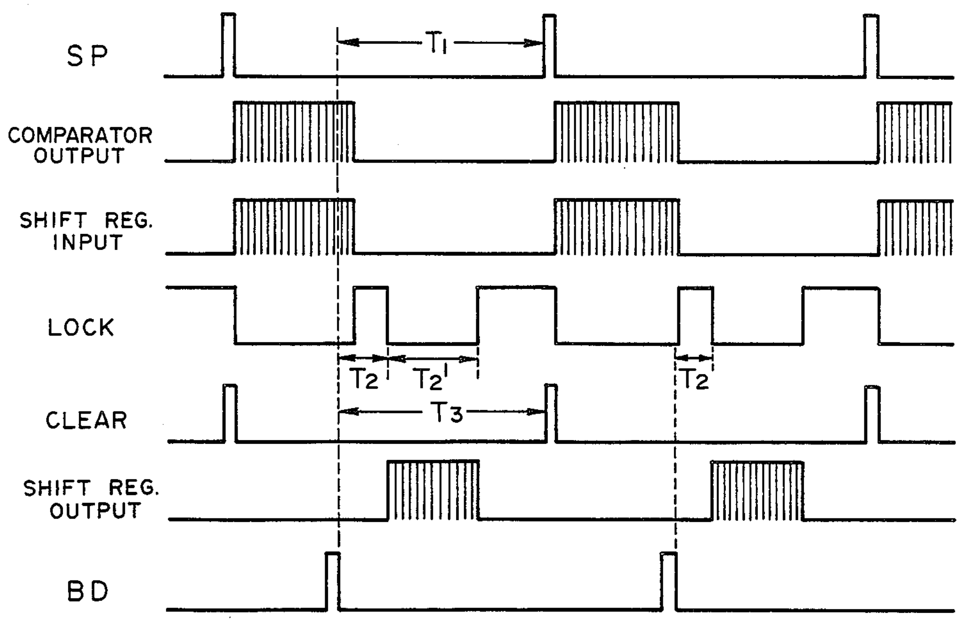
FIG. 3B is the drawing showing a timing chart at each section of FIG. 3A.

FIG. 3B shows the timing chart for the above.

Figure 4A:
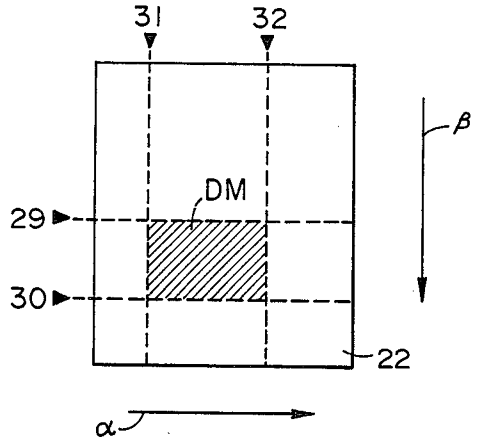
FIG. 4A is a drawing showing the original 22.

In FIG. 4A, the arrow mark α shows the main scanning direction of the CCD one dimensional image sensor and the arrow mark β shows the subscanning direction of the image sensor. Moreover, the portion DM covered with oblique lines shows the region of original 22 designated by the cursors 29, 30, 31 and 32.

Figure 4B:
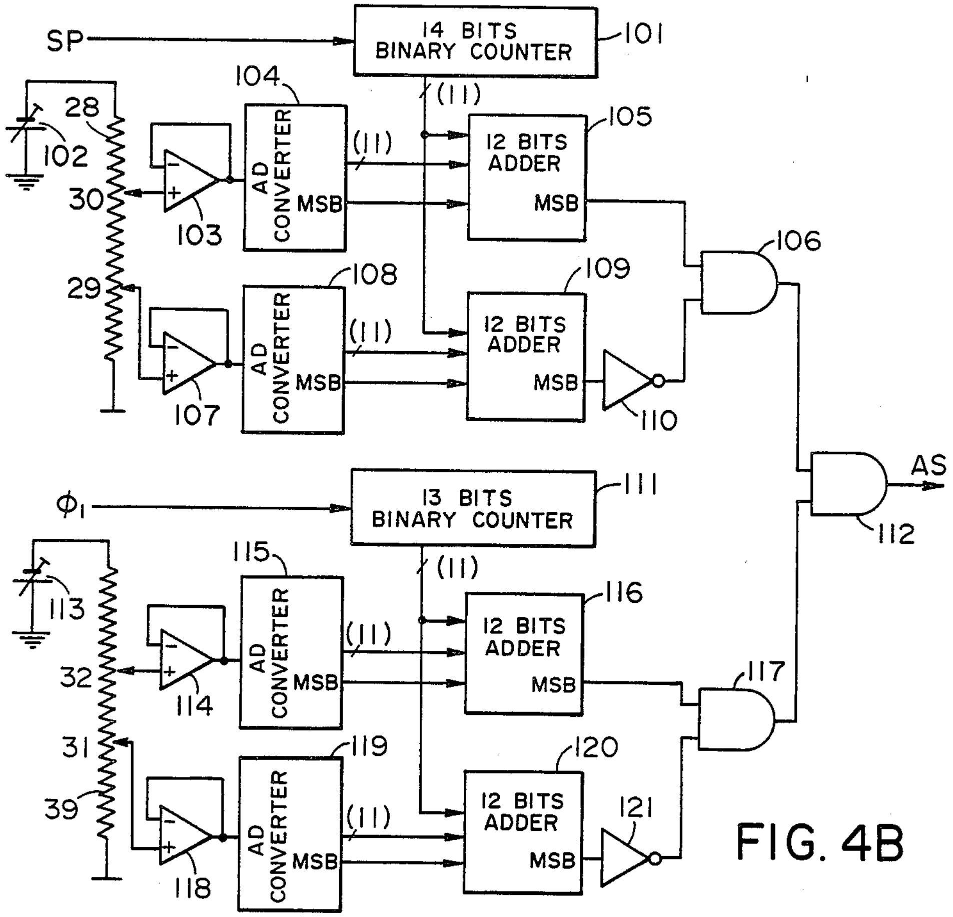

FIG. 4B shows the circuit which obtains the signal AS which is ON while the picture information of the region DM of FIG. 4A is being read. 101 is a 14 bit binary counter which adds the start pulse SP which is output every time the image sensor performs main scanning. Accordingly the output of the binary counter 101 shows the reading position of CCD in the subscanning direction. 111 is a 13 bit binary counter which counts the reading clock pulse $\phi_1$ coming from the CCD. Accordingly, the output of the counter 111 shows the reading position of the CCD in main scanning direction.

The resistance reading by cursors 29, 30, 31 and 32 is done by applying predetermined voltage coming from the constant voltage generators 102 and 113 to the resistors 28 and 39 and by reading the voltages by the voltage followers 103, 107, 114 and 118 formed by high input impedance operational amplifiers. The outputs of the voltage followers are respectively digitalized by 12 bit AD (analog-digital) converters 104, 108, 115 and 119. In this case negative voltages, which are 2's complement outputs, are made the outputs of the AD converters 104, 108, 115 and 119.

By so doing, the H level is obtained at the most significant bit MSB when the voltage is negative. When the addition between the outputs of the AD converters and the outputs of the binary counter is made (actually subtraction because the outputs of the AD converters are complements) at the 12 bit adding circuits 105, 109, 116 and 120, and when the 11 bit output of the binary counter is larger, the MSB outputs of the adding circuits are at L level, and H level is obtained when it is smaller. However, in the addition, the high order 11 bits of the 13 bit or 14 bit counter and the low order 11 bits of the AD converter are added.

In other words when the MSB's of the adding circuits 105 and 116 are at H level and the MSB's of the adding circuits 109 and 120 are at L level, the CCD performs the reading of the region DM of FIG. 4A and at this time the signal AS is output by way of the gates 106, 110, 112, 117, 121, etc.

The 14 bit binary counter 101 is reset by the reversal signal of the original table and the 13 bit binary counter 111 is reset by the start pulse SP. Now the method for setting the input voltages of the AD converters 104, 108, 115 and 119 will be described. It is assumed that the maximum original is of the size A3 and that the picture is resolved at the resolution of 20 lines per mm.

Since the dimensions of size A3 are 420 mm×297 mm, the distance in the main scanning direction of the CCD is made 297 mm and that in the subscanning direction 420 mm.

Then 5940 bits are obtained in the main scanning direction and 8400 in the subscanning direction. The 13 bit binary counter 111 counts these 5940 bits and the 14 bit binary counter 101 counts the 8400 bits. When 5940 is binary coded it becomes 1, 011, 100, 110, 100. The high order 11 bits are 10, 111, 001, 101 (1485 in decimal number) and its complement is 101, 001, 110, 011.

Accordingly, it is sufficient to adjust the input voltages of the AD converters so that the outputs of the AD converters 115 and 119 are between 111, 111, 111, 111 and 101, 000, 110, 011.

If the AD converters 115 and 119 correspond to the input between −10 V and 10 V, it is sufficient to adjust the input voltages of the AD converters 115 and 119 to values between −2.44 mV and −3,62549 V. Similarly the 8400 bits in the subscanning direction will become 10, 000, 011, 010, 000 when they are binary coded.

The high order 11 bits of it is 10, 000, 011, 010 (1050 in decimal number) and its 2's complement is 101, 111, 100, 110.

Accordingly, it is sufficient to adjust the input voltages of the AD converters 104 and 108 so that their outputs are between 111, 111, 111, 111 and 101, 111, 110, 110. When the AD converters 104 and 108 correspond to the inputs between −10 V and 10 V, then it is sufficient to adjust the input voltages of the AD converters 104 and 108 to values between −2.44 mV and −2,56348 V. Since in this embodiment the distance 297 mm in the main scanning direction is divided into 1485 parts the cursor positions in the main scanning direction can be set at intervals of 297÷1485=0.2 mm. The cursor positions in the subscanning direction can be set at intervals of 420÷1050=0.4 mm.

In ordinary pictures this much of an interval is sufficient to be the interval between cursor position. If the above-mentioned interval can be larger, 8 bit adders can be used in place of 12 bit adders.

Figure 5A:
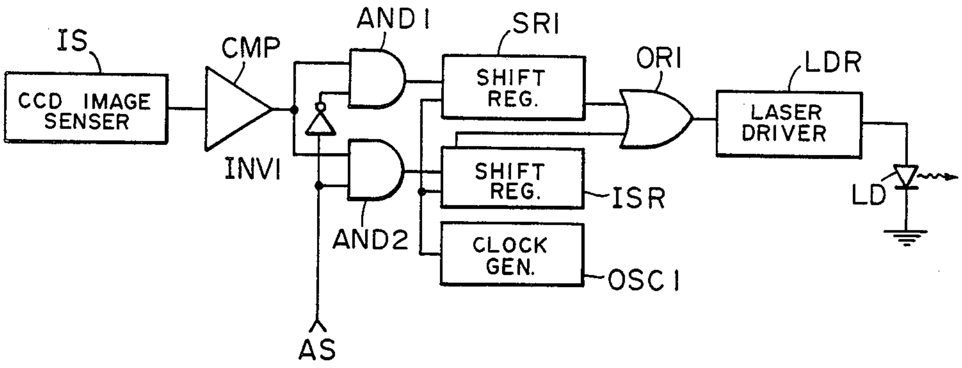
FIG. 5A is a diagram of a circuit for back printing a specified portion of region.

FIG. 5A shows an example of a circuit used to perform back side printing of only the cursor designated region as shown in FIG. 2B.

Figure 5B:
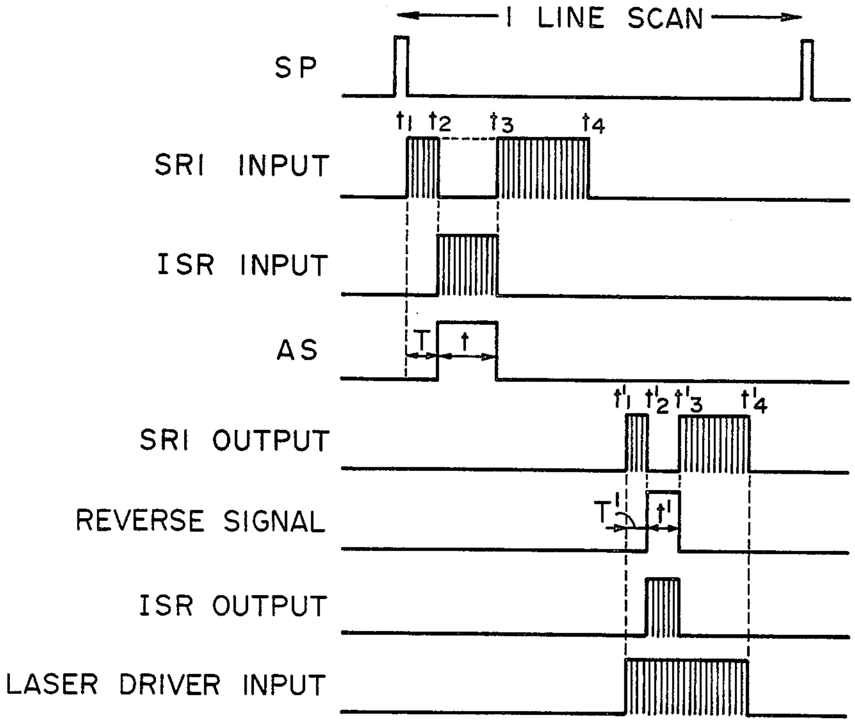
FIG. 5B is a drawing showing the timing chart of each section of FIG. 5A.

FIG. 5B shows the timing chart when in this case a signal AS enters during 1 line scanning.

In FIG. 5A, IS shows a CCD image sensor, CMP a comparator, INV1 an inverter, AND1,2 AND gates, SRI, a shift register, ISR an inverse shift register, OSC1 a clock generator, OR1 an OR gate, LDR a laser driver, and LD a semiconductor laser. In the drawing, the output from the CCD image sensor IS is passed through the comparator CMP and, when the signal AS is at L level, input to the shift register SR by way of the AND gate AND1.

When the signal AS is at H level, the output is input to the inverse shift register by way of the AND gate AND2.

Although bit shift is made by the clock from the clock generator OSC in the shift register while the pulse signal that has been read by the inverse shift register is being input, only the necessary signals are input to the inverse shift register ISR. Although the operating signal of the shift register is not illustrated it can be one similar to that shown in FIG. 3A.

Input is made to the inverse shift register ISR by forward shift during the period of the AS signal but, in the case of output, reverse shift is made by an signal, and a data pulse is output from the inverse direction output terminal.

As the inverse shift register ISR, the register formed by ladder connecting necessary numbers of bi-directional shift registers of, for example, SN 74198 (commercial name: a product of Texas Instruments Co. Ltd.) type can be used.

As for the inverted signal, it is sufficient by counting the number of input shift clocks during the period between the generation of the start pulse SP and the generation of the signal AS and when, after the shift register is in the output stage, the number of the output shift clocks has the same count as the number of the above-mentioned input shift clocks, to bring the inverted signal to H level. The inverted signal pulse width can also be determined in similar way. It is necessary and sufficient for both the shift register and the inverse shift register to have the same bit capacity as that of CCD. In this way the signals which were made by inverting the read out signals of the image sensor in a designated region against time can be obtained.

Figure 6:
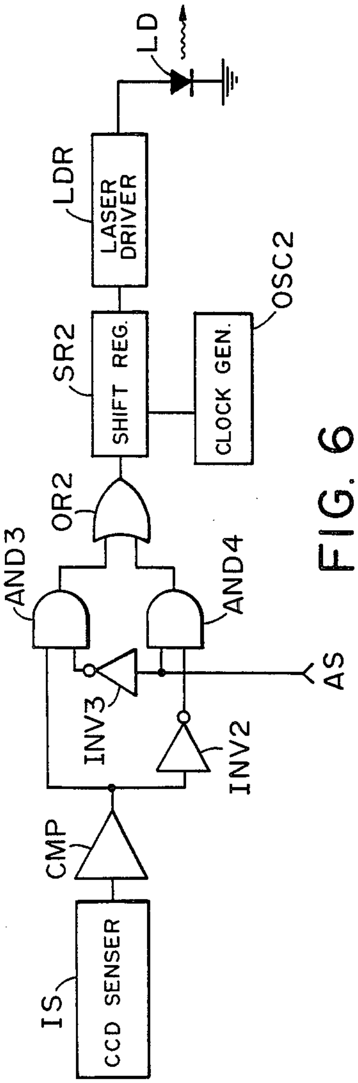
FIG. 6 is a diagram of a circuit to reverse one designated region.

FIG. 6 shows an example of a circuit which inverts only the cursor designated region as shown in FIG. 2C. In FIG. 6, the items having the same function as in FIG. 5A have the same symbols.

In FIG. 6, the digital picture signals coming from the comparator CMP are input to the shift register SR2 by way of AND gate AND3 and OR gate OR2 when the signal AS is at L level. When the signal AS is at H level, the gate AND3 is closed and the inverted signal of the comparator CMP output is input to the shift register SR2 by way of the AND gate AND4 and OR gate OR2.

In this way the signal made by inverting the readout signal in the designated area against the amplitude axis can be obtained.

Figure 7:
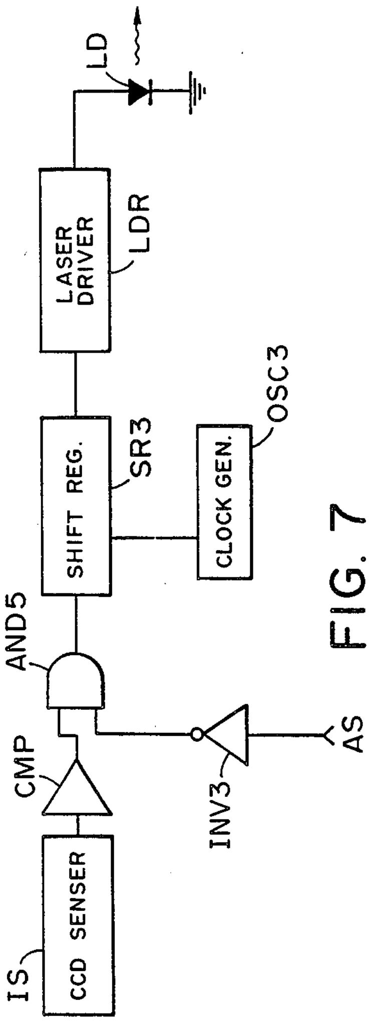
FIG. 7 is a diagram of a circuit used to trim the portion other than the designated region.

FIG. 7 shows an example of configuration to trim a portion other than the cursor designated region as shown in FIG. 2D. In FIG. 7 the same symbols are used as in FIG. 5A for the items having the similar functions. In the drawing the output of the comparator CMP is input to the shift register SR3 by way of the AND gate AND5 only when the signal AS is at L level.

Figure 8:
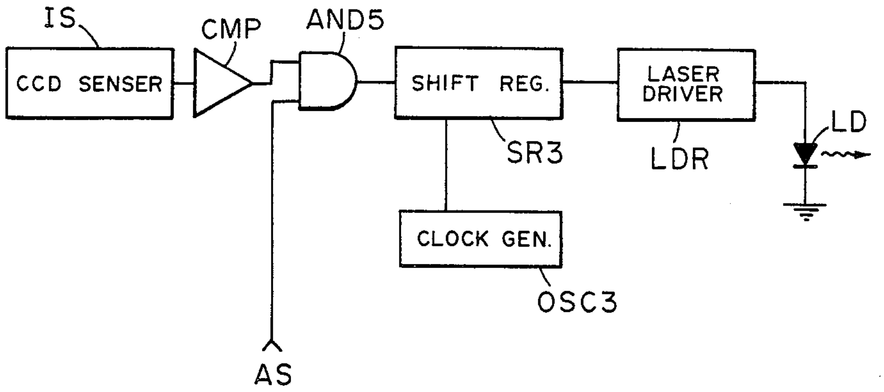
FIG. 8 is a diagram of a circuit to trim the designated region.

If the configuration shown in FIG. 8 is obtained by removing the inverter INV3, then the cursor designated region can be made the region for trimming as shown in FIG. 2D. The image sensor IS and shift registers SR2 and SR3 can be controlled in the same manner as shown in FIG. 3A.

FIG. 9A shows an example of concrete configuration for performing deformation in the main scanning direction as shown in FIG. 2E, utilizing signal processing means as described below to indicate change in magnification. The photoelectrically converted picture information signals coming from the CCD sensor 201 are digitized by the comparator 202, stored once either in the shift register 205 or 214 and, in the next laser write cycle, output from said register to the laser driver 209 by the change-over gates 206, 207, 208, 212 and 215.

The gates 203, 204, 206 through 208, 211 through 213, and 215 work as the selector switch of the shift registers 205 and 214. The shift register 205 is a shift register with speed and frequency fixed by the clock generator 221. The shift register 214 is enabled to select the above-mentioned clock coming from the clock generator 221 or the clock of the PLL oscillator 223 which oscillates at the shift frequency determined by the deformation magnification determining means which will be described later. The shift register 214 for deformation can be made clock variable at input time or at output time or both at the same time. In this case clock is made variable at output time.

For this reason, the clock from the first clock oscillator 221 is used at time of inputting the shift register 214 and, at time of output, the clock from the PLL oscillator 223 is used.

The gates 217 through 219, and 224 are clock selecting switches. In the case of deformation mode the signal DON is applied to the gates 222 and 225.

The down counter 228, binary counter 235, gates 229 through 233, and the delay circuit 234 are the pulse generators to determine the CCD read cycle and laser write cycle.

The down counter 228, whose logical value is 1 after it has counted a predetermined number of clocks, is reset by the delay circuit 234.

The delay time To of the delay circuit 234 is set as To<(CCD read cycle time or laser write cycle time). The variable voltage source 236 and AD converter 237 are the deformation magnification determining or setting means to determine the deformation magnification and the voltage source 236 interlocks with the knob, etc. on the outside of the unit.

The power source 243, sliding resistor 244, AD converters 245 and 252 are used to determine the deformation position in one main scanning, and output the number of clocks in one main scanning.

The AD converted deformation magnification and deformation position are latched by the latch circuits 238, 246, and 253 at time of copy start, held during one copying, and then reset when the copying is finished. The arithmetic unit 254 computes $D=\frac{1}{2}\{(A-B)\times C-(A-B)\}$. Where, D shows one half of the clock number remaining when deformation is made as shown in FIG. 2E. The subtractor 247 computes $E=A-D$ and the adder 255 performs the addition of $F=B+D$. Being delayed by the time consumed in arithmetic operation and addition and subtraction, these values are latched by the latch circuits 239, 248, 256 and 261. 240, 247, 257, 262 are preset type down counters, which determine the count value by the preceding latch output and, at the same time as the write cycle of the read is started, start down count and generate a short one-shot pulse when the count is 0.

Where A shows among the read information the count value at which deformation is started and B shows the count value at which the deformation is ended. E shows the count value where the laser 210 starts write information and F shows the ending count value. Accordingly, among the read information, the signal d, which indicates the state of performing deformation, and, among the write information, the signals e and f, which indicate the state of performing deformation, are output to the gate 242 and gate 251. The signal e is obtained when the magnification C is C<1 and the signal f is obtained when C>1.

The signal d and signals e and f can be obtained by the output of the gate 106 of FIG. 4B.

Figure 9B:
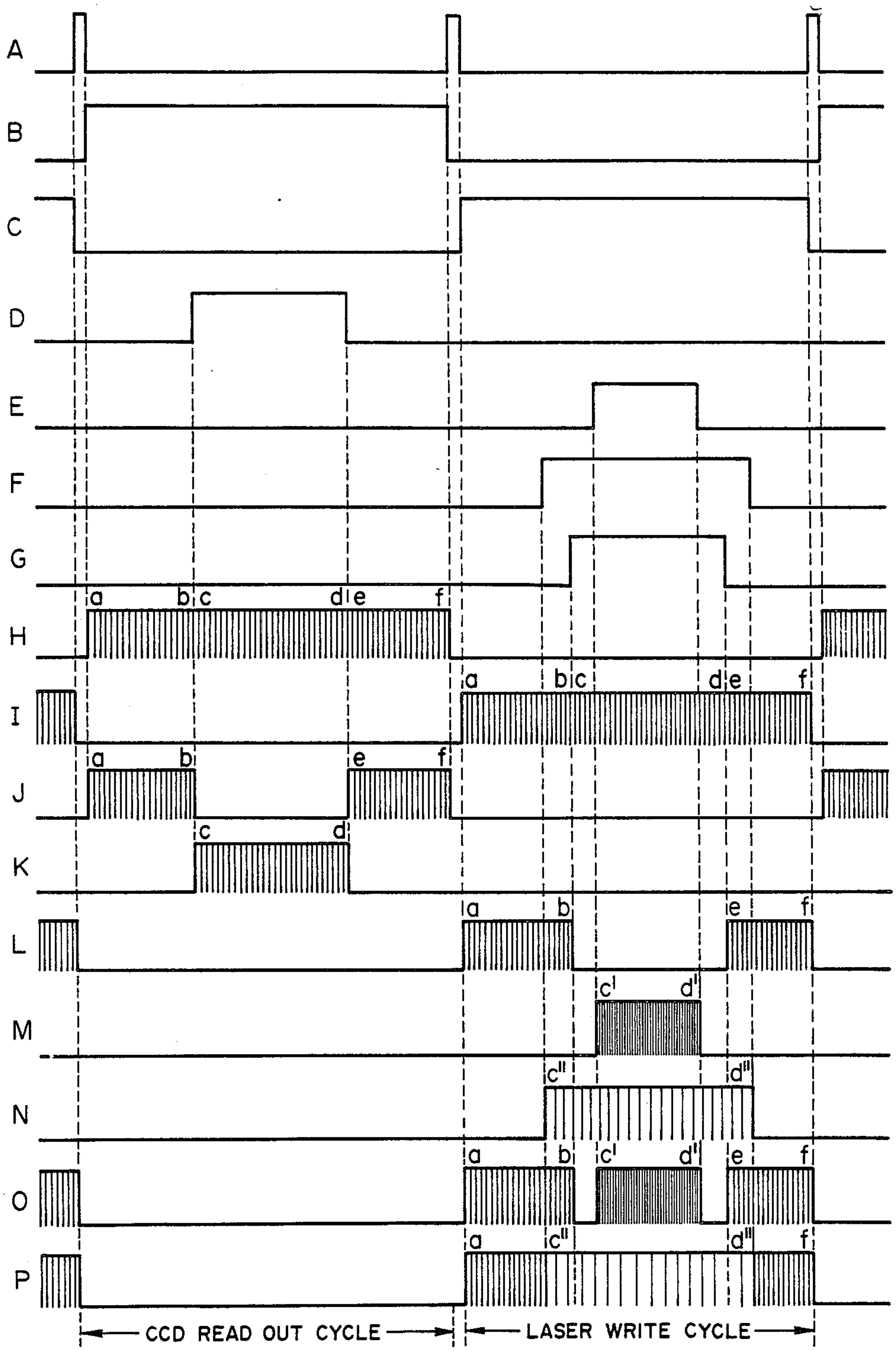
FIG. 9B is a drawing showing the timing chart of each section of FIG. 9A.

These signals are ANDed at the gates 271 and 272 with the deformation position signal SSP in the subscanning direction and then input to the gates 227 and 233. The time chart of FIG. 9B shows the operations of signals in the circuit shown in FIG. 9A.

The signal A shows the main scanning start signal, the signal B the signal showing the period during which reading is made from the image sensor, and the signal C shows the period the laser is writing. When the mode is other than the deformation mode the input signal H is output as the output signal I unchanged. Next, signal operations in deformation mode will be described.

Since the region signal D to be deformed is obtained by the deformation position determining means, it is distributed to the two shift registers 205 and 214 with the same clock.

In other words, the signal J is input to the shift register 205, and the signal K to the shift register 214. However, the shift register 214 performs shifting between the extra write and read cycles so that the head of the signal K comes. Next, in the writing by the laser, the shift register is selected by the computed deform region signal E or F. In this case, the output of the shift register 214 is shifted by the clock oscillated from PLL oscillator 223 by deformation magnification C, and, as a result, picture signal in which only a portion of the picture is deformed in the main scanning direction, such as the signal O or P, is obtained.

In the preceding cases the deformed information was given priority by signal processing means. Therefore information became the signal like the signal P. However, it is allowed to give priority to the signal Q which does not include the deform region.

In this way, signals which are obtained by compressing or expanding the read signal from the image sensor in the designated region in the time axis direction can be obtained. Moreover, to perform the equal ratio deformation of the designated region it is sufficient to rotate by 90° the picture once obtained by deformation and set the picture on the original table.

If such analog shift register as BBD is used as the shift register with the joint use of analog switches, all processes may be processed by analog signals and the gradation of the picture may become drastically improved.

As has been described so far, according to this invention a unit which eliminates the use of a large capacity page memory and CRT display can be provided. This invention is not limited to the above-mentioned embodiments but is allowed to be varied in many ways within the range shown by the claims.

What I claim is:

1. A picture processing system comprising:

an image sensor for reading an original picture and generating a picture signal output indicative of said reading;

a position designating means for designating a partial region of said original picture;

a signal processing means connected to said image sensor and to said position designating means for processing the picture signal output from said image sensor and for producing a processed signal output in accordance with a change in magnification of the original picture represented by the picture signal read from said partial region; and a recording means for recording on a recording medium a reproduced picture represented by said processed signal output by said processing means in accordance with the change of magnification of the original picture represented by the signal read from said partial region.

2. A picture processing system as set forth in claim 1, wherein said processed signal output from said signal processing means is obtained by either compressing or expanding said picture signal in said partial region relative to time.

3. A picture processing system according to claim 1 further comprising magnification determining means for determining the change of magnification by said signal processing means.

4. A picture processing system according to claim 3 wherein a recording position of said recording means relative to said recording medium is determined in accordance with the partial region designated by said position designating means and the magnification determined by said magnification determining means.

5. A picture processing unit comprising:

an original table on which an original is placed with a surface carrying a picture to be read facing upwardly;

a positioning means for designating a partial region on said original, said positioning means designating the partial region relative to said original table;

a converting means for converting the partial region designated by said positioning means into electrical digital signals;

a reading means for reading the picture on said original place on said original table and for generating a read signal indicative of said reading;

a counting means for counting the number of signals used in the reading operation of said reading means; and a processing means for processing the read signal generated by said reading means in accordance with the counts of said counting means and said digital signals produced by said converting means.

6. A picture processing unit as set forth in claim 5 in which said reading means includes one dimensional image sensor.

7. A picture processing unit as set forth in claim 6 wherein said image sensor and said original are relatively movable for scanning in a subscanning direction perpendicular to the main scanning direction and said positioning means includes a first pair of positioning members mounted relative to the original table in the main scanning direction and a second pair of positioning members mounted relative to the original table in the subscanning direction.

8. A picture processing unit as set forth in claim 7, said converting means comprising two rod resistors, each having linear resistivity, and to each of which one of said first and said second pairs of positioning members is electrically movably connected, and constant voltage generating means for applying a predetermined voltage to each of said resistors, wherein the voltage produced at each of said positioning members corresponds to the position of said positioning member relative to the resistor to which it is connected.

9. A picture processing unit as set forth in claim 5, wherein said processing means inverts said read signal in said partial region with respect to time.

10. A picture processing unit as set forth in claim 5, wherein said processing means inverts said read signal in said partial region with respect to amplitude.

11. A picture processing unit as set forth in claim 5, wherein said processing means holds the read signal obtained during reading of said partial region to a specified level.

12. A picture processing unit as set forth in claim 5, wherein said processing means holds the read signal obtained during reading of regions of the original picture other than said partial region to a specified level.

13. A picture processing unit as set forth in claim 5, wherein said processing means performs at least one of compression and expansion of said read signal in said partial region relative to time.

14. A picture processing unit comprising:

an original table on which an original may be placed with a surface carrying a picture to be read facing upwardly;

reading means, including a one dimensional image sensor, for reading said picture on said surface of said original from above said original by scanning said surface in main scanning and subscanning directions;

movable positioning means for designating a partial region on said original, said positioning means including a first pair of movable positioning members mounted relative to said original table in said main scanning direction of said image sensor and a second pair of movable positioning members mounted relative to said original table in said subscanning direction of said image sensor;

converting means for converting the positions of said positioning members into electrical signals, said converting means comprising two rod resistors, each having linear resistivity, and to each of which one of said first and said second pairs of positioning members is electrically movably connected, and constant voltage generating means for applying a predetermined voltage to each of said resistors wherein the voltage produced at each of said positioning members corresponds to the position of said positioning member relative to the resistor to which it is connected;

means for generating clock signals during scanning of said image sensor in said main scanning direction;

a first counter for counting the number of clock signals generated during scanning by said image sensor in one main scanning in order to detect the read position of said image sensor relative to said original in said main scanning direction, and a second counter for counting the number of main scannings by said image sensor in order to detect the read position of said image sensor on said original in said subscanning direction.

15. A picture processing unit as set forth in claim 14 further comprising two analog-digital converters, one for each of said main scanning direction and said subscanning direction, for performing analog-digital conversion of the output of said converting means.

16. A picture processing unit comprising:

a one dimensional image sensor, having a main scanning direction, for reading a picture on an original and generating a read signal indicative thereof, said image sensor and said original being relatively movable in a subscanning direction perpendicular to the main scanning direction of the image sensor;

means for generating clock signals during scanning by said image sensor in said main scanning direction;

designating means for designating a partial region of the original and comprising two members movable relative to the original in each of the main scanning direction and subscanning direction;

an output means for outputting as digital values the positions designated by said designating members in said main scanning direction and in said subscanning direction;

first counting means for counting the number of clock signals generated during scanning by said image sensor in one main scanning in order to detect the read position of said image sensor relative to the original in said main scanning direction;

second counting means for counting the number of main scannings by said image sensor in order to detect the read position of said image sensor on the original in said subscanning direction;

a signal generating means for generating identification signals when said image sensor is reading the picture of the partial region on the original designated by said designating members and the corresponding output value of said output means and said counts of said first and said second counting means; and a processing means for processing the read signal generated by said image sensor in one manner when said identification signal is being generated and in a different manner when said identification signal is not being generated.

17. A picture processing unit as set forth in claim 16 further comprising a movable original table on which the original may be placed, the original picture being read by the movement of said original table with respect to said image sensor.

18. A picture processing unit as set forth in claim 16 further comprising a recording means which records the picture corresponding to said original picture in accordance with the output of said processing means.

19. A picture processing unit as set forth in claim 16, said processing means having first and second memories to store the read signals generated by said image sensor, and, when said identification signal is not being generated, storing said read signals in said first memory, and when said identification signal is being generated, storing said read signals in said second memory.

20. A picture processing unit as set forth in claim 19, said processing means being operative to make said second memory one which may be read in an order reversed from that in which data is written thereinto to obtain said read signal in said designated region which is inverted with respect to time.

21. A picture processing unit as set forth in claim 19 said processing means being operative to compress or expand relative to time said read signal in said designated region by making the read frequency for reading the signals stored in said first memory different from the read frequency for reading the signals stored in said second memory.

22. A picture processing unit as set forth in claim 16, said processing means further including a store member which stores the read signals generated by said image sensor.

23. A picture processing unit as set forth in claim 22, said processing means being operative to reverse said read signal when said identification signal is being generated, store said reversed read signal in said store member and obtain a signal made by reversing said read signal in said designated region with respect to amplitude.

24. A picture processing unit as set forth in claim 22, said processing means inhibiting the input of said read signal to said store member while said identification signal is being generated.

25. A picture processing unit comprising:

a one dimensional image sensor, having a main scanning direction, for reading the picture on an original and generating a read signal indicative of said reading, said image sensor and said original being mounted for relative movement in a subscanning direction perpendicular to the main scanning direction of the image sensor;

means for generating clock signals during scanning by said image sensor in the main scanning direction;

designating means for designating a partial region of the original;

an output means which outputs as digital values the partial region designated by said designating means in the main scanning direction and subscanning direction;

a first counting means for counting the number of clock signals generated during scanning by said image sensor in each main scanning in order to detect the read position of said image sensor on the original in the main scanning direction;

a second counting means which counts the number of main scannings in order to detect the read position of said image sensor on the original in the subscanning direction; and a processing means which processes the read signal generated by said image sensor in accordance with the output values of said output means and with the counts of said first and said second counting means.

26. A picture processing unit according to claim 25, further comprising an original table on which the original may be placed to be read and wherein said designating means outputs a positioning signal corresponding to the position of an original placed on the original table at the time when the reading is performed.

27. A picture processing unit according to claim 25 wherein the original to be read by said image sensor is placed for reading on a predetermined table with the surface to be read facing upwardly.

28. A picture processing unit as set forth in claim 25, wherein said processing means inverts said read signal in said partial region with respect to time.

29. A picture processing system as set forth in claim 25, wherein said processing means inverts said read signal in said partial region with respect to amplitude.

30. A picture processing system as set forth in claim 25, wherein said processing means holds the read signal obtained during reading of said partial region to a specified level.

31. A picture processing system as set forth in claim 25, wherein said processing means holds the read signal obtained during reading of regions of the original picture other than said partial region to a specified level.

32. A picture processing system as set forth in claim 25, wherein said processing means at least one of compresses and expands said read signal in said partial region relative to time.

33. A picture processing system comprising:

an image sensor for reading an original picture line by line and producing a picture signal indicative of the reading;

means for generating clock signals used for reading operation of said image sensor;

designating means for designating a partial region of the original;

counting means for counting the number of said clock signals generated by said generating means to discriminate the partial region designated by said designating means;

a memory means for storing the picture signal produced by said image sensor line by line;

a control means for controlling the read/write operation of said memory means in accordance with the counts of said counting means, so as to achieve a desired picture processing for the image on the partial region designated by said designating means; and a recording means for recording the picture in accordance with the signal read from said memory means.

34. A picture processing system according to claim 33, wherein said memory means comprises at least one shift register.

35. A picture processing system according to claim 33, wherein said control means inhibits said memory means from storing the picture signal obtained in reading the image on the partial region by said image sensor.

36. A picture processing system according to claim 33, wherein said control means inhibits said memory means from storing the picture signal obtained in reading the image on the original picture in regions other than the partial region.

37. A picture processing system according to claim 33, wherein said control means causes a read out speed of the picture signal from said memory means to be differentiated between the inside and the outside of the partial region.

* * * * *

UNITED STATES PATENT AND TRADEMARK OFFICE

CERTIFICATE OF CORRECTION

PATENT NO. : 4,739,350

DATED : April 19, 1988

INVENTOR(S) : K. ARAO

It is certified that error appears in the above-identified patent and that said Letters Patent is hereby corrected as shown below:

IN THE DRAWINGS

Sheet 3, Fig. 3A, "CCD IMAGE SENSER" should read --CCD IMAGE SENSOR--.

Sheet 5, Fig. 5A, "CCD IMAGE SENSER" should read --CCD IMAGE SENSOR--.

Sheet 6, Fig. 6, "CCD SENSER" should read --CCD SENSOR--.

Sheet 6, Fig. 7, "CCD SENSER" should read --CCD SENSOR--.

Sheet 7, Fig. 8, "CCD SENSER" should read --CCD SENSOR--.

Sheet 8, Fig. 9A-1, "CCD SENSER" should read --CCD SENSOR--.

COLUMN 1

Line 24, "light sensitive" should read --light-sensitive--.

UNITED STATES PATENT AND TRADEMARK OFFICE

CERTIFICATE OF CORRECTION

PATENT NO. : 4,739,350

DATED : April 19, 1988

INVENTOR(S) : K. ARAO

It is certified that error appears in the above-identified patent and that said Letters Patent is hereby corrected as shown below:

COLUMN 2

Line 18, "cross sectional" should read --cross-sectional--.
Line 31, "the" should read --a--.
Line 56, "cross sectional" should read --cross-sectional--.

COLUMN 3

Line 4, "collime-" should read --collima- --.
Line 18, "surface glass" should read --surface of glass--.
Line 19, "pressure" should read --a pressure--.

COLUMN 5

Line 56, "position." should read --positions.--.
Line 65, "AND1,2" should read --AND1, 2--.

UNITED STATES PATENT AND TRADEMARK OFFICE

CERTIFICATE OF CORRECTION

PATENT NO. : 4,739,350

DATED : April 19, 1988

INVENTOR(S) : K. ARAO

It is certified that error appears in the above-identified patent and that said Letters Patent is hereby corrected as shown below:

COLUMN 6

Line 6, "register by" should read --register ISR by--.
Line 17, "an signal," should read --an inverted signal,--.
Line 37, "read out" should read --read-out--.

COLUMN 9

Line 38, "place" should read --placed--.

COLUMN 12

Line 56, "system" should read --unit--.
Line 59, "system" should read --unit--.
Line 63, "system" should read --unit--.
Line 67, "system" should read --unit--.

UNITED STATES PATENT AND TRADEMARK OFFICE
CERTIFICATE OF CORRECTION

PATENT NO. : 4,739,350

DATED : April 19, 1988

INVENTOR(S) : K. Arao

It is certified that error appears in the above-identified patent and that said Letters Patent is hereby corrected as shown below:

COLUMN 14

Line 19, "read out" should read -- read-out --.

Signed and Sealed this

Seventh Day of November, 1989

*Attest:*

JEFFREY M. SAMUELS

*Attesting Officer*

*Acting Commissioner of Patents and Trademarks*